(12) United States Patent
Wagenbach (10) Patent No.: US 11,845,140 B2
(45) Date of Patent: Dec. 19, 2023

(54) ULTRASONIC WELDING DEVICE WITH COOLING FOR OSCILLATOR ASSEMBLY

(71) Applicant: SCHUNK SONOSYSTEMS GMBH, Wettenberg (DE)

(72) Inventor: Udo Wagenbach, Buseck (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 17/767,318

(22) PCT Filed: Nov. 7, 2019

(86) PCT No.: PCT/EP2019/080544
§ 371 (c)(1),
(2) Date: Apr. 7, 2022

(87) PCT Pub. No.: WO2021/089155
PCT Pub. Date: May 14, 2021

(65) Prior Publication Data
US 2022/0362877 A1  Nov. 17, 2022

(51) Int. Cl.
*B23K 20/00* (2006.01)
*B23K 20/10* (2006.01)
*B23K 20/26* (2006.01)

(52) U.S. Cl.
CPC ............ *B23K 20/106* (2013.01); *B23K 20/26* (2013.01)

(58) Field of Classification Search
CPC .... B23K 20/10; B23K 2101/38; B23K 20/26; B23K 31/125; B23K 20/22; B23K 2101/32; B23K 37/0435; B23K 37/0452; B23K 37/047
See application file for complete search history.

(56) References Cited

U.S. PATENT DOCUMENTS

| | | | | |
|---|---|---|---|---|
| 8,047,420 | B2 * | 11/2011 | Stroh | H01R 4/625 228/110.1 |
| 9,419,490 | B2 * | 8/2016 | Kajita | H02K 15/0062 |
| 10,357,845 | B2 * | 7/2019 | Wagner | H01R 43/0207 |

(Continued)

FOREIGN PATENT DOCUMENTS

| CN | 101754591 A | 6/2010 |
|---|---|---|
| CN | 207643740 U | 7/2018 |

(Continued)

OTHER PUBLICATIONS

International Search Report dated Aug. 7, 2020, in corresponding to International Application No. PCT/EP2019/080544; 5 pages (with English Translation).

(Continued)

*Primary Examiner* — Erin B Saad
(74) *Attorney, Agent, or Firm* — Maier & Maier, PLLC (57) ABSTRACT

A sonotrode assembly for an ultrasonic welding device. The sonotrode assembly includes a oscillator assembly and a cooling device. The cooling device includes at least one cooling body. The cooling body is held supported in the cooling device in such a manner that the cooling body is reversibly displaceable between an abutting position in which a contact surface of the cooling body abuts on a contact surface of the oscillator assembly and a spaced position in which the contact surface of the cooling body is spaced apart from the contact surface of the oscillator assembly.

12 Claims, 2 Drawing Sheets

(56) References Cited

U.S. PATENT DOCUMENTS

| | | | | |
|---|---|---|---|---|
| 11,165,211 | B2* | 11/2021 | Wagenbach | H01R 43/0207 |
| 11,424,585 | B2* | 8/2022 | Schmidt | H01R 43/0207 |
| 2003/0066863 | A1* | 4/2003 | Skogsmo | B23K 20/106 |
| | | | | 228/111.5 |
| 2008/0265004 | A1* | 10/2008 | Stroh | H01R 43/0207 |
| | | | | 228/110.1 |
| 2010/0170935 | A1* | 7/2010 | Stroh | B23K 20/10 |
| | | | | 228/110.1 |
| 2013/0293045 | A1* | 11/2013 | Kajita | B23K 20/10 |
| | | | | 310/71 |
| 2017/0282289 | A1* | 10/2017 | Wagner | B23K 20/26 |
| 2019/0030639 | A1* | 1/2019 | Schmidt | H01R 43/0207 |
| 2019/0173251 | A1* | 6/2019 | Wagenbach | H01L 24/78 |
| 2019/0260141 | A1* | 8/2019 | Tamagawa | H01R 4/023 |
| 2019/0344378 | A1* | 11/2019 | Shohara | B23K 20/004 |
| 2020/0091691 | A1* | 3/2020 | Sato | H01R 43/0207 |

FOREIGN PATENT DOCUMENTS

| | | |
|---|---|---|
| CN | 208507406 U | 2/2019 |
| CN | 208529526 U | 2/2019 |
| CN | 208960993 U | 6/2019 |
| CN | 209363848 U | 9/2019 |
| CN | 209504939 U | 10/2019 |
| CN | 115647556 A | 1/2023 |
| DE | 10151992 A1 | 5/2003 |
| GB | 884306 A | 12/1961 |
| JP | S5612587 U | 2/1981 |
| JP | S5763220 A | 4/1982 |
| JP | 2002-118152 A | 4/2002 |
| JP | 2008142738 A | 6/2008 |
| JP | 2012161767 A | 8/2012 |

OTHER PUBLICATIONS

Office Action dated May 31, 2023, in corresponding Chinese Application No. 201980101618.8, 23 pages.

Office Action dated Jun. 6, 2023, in corresponding Japanese Application No. 2022-525808, 10 pages.

* cited by examiner

ULTRASONIC WELDING DEVICE WITH COOLING FOR OSCILLATOR ASSEMBLY

FIELD

The present invention relates to an ultrasonic welding device. In particular, the invention relates to a sonotrode assembly for an ultrasonic welding device.

BACKGROUND

For a wide variety of technical applications, it may be necessary to join two components together in a mechanically secure and/or electrically conductive manner For example, it may be necessary for various purposes to join cables or their strands to contact parts, connector parts or to each other mechanically and in an electrically conductive manner This may be used, for example, to produce wiring harnesses or cable looms with the aid of which electrical consumers, inside a vehicle for example, may be electrically connected to each other, to an energy source and/or to a control system.

So-called ultrasonic welding was developed to produce substance-to-substance bonds between two electrically conductive components, providing them with high strength and good electrical conductivity. It is a special form of friction welding in which components to be welded, also referred to as joining partners or weld material, are brought into surface contact with each other and moved against each other under low pressure and high-frequency mechanical vibrations. In this case, the vibrations may be generated with the aid of an oscillator assembly, which comprises an ultrasonic vibration generator and a sonotrode, in which ultrasonic vibrations with frequencies of typically 20 kHz to 50 kHz are generated and transmitted by means of a sonotrode to at least one of the joining partners. Plastic flow then allows the joining partners to permeate or interlock with each other close to the surface without the materials of the joining partners necessarily melting. Ultrasonic welding may therefore be used to bond joining partners together with low impact, quickly and economically.

Ultrasonic welding may also be used in particular for welding metal joining partners, such as strands of cables or individual wires or conductors of such strands, for example. As joining partners, one or more strands or cables may also be welded to a contact part or connector part. Ultrasonic welding may also be used to join sheets to each other or to other types of joining partners. For this purpose, the joining partners are generally inserted into a receiving chamber of an ultrasonic welding device and then welded together between an ultrasonically vibrating sonotrode and an anvil.

In ultrasonic welding, the sonotrode typically heats up during the welding process, in particular due to the introduction of ultrasonic vibrations and the resulting friction between the sonotrode and the joining partners. In this case, partial regions of the sonotrode may reach temperatures of well over 100° C., temporarily even up to 300° C. locally, depending on the application. However, increased temperatures during an ultrasonic welding operation may have an adverse effect on a quality of a weld to be produced between joining partners. In the course of a plurality of welds, surrounding components may also heat up which may also impair a quality of the welding results.

Various approaches have therefore been developed to cool the sonotrode and/or other components of an oscillator assembly during an ultrasonic welding process. For example, a cooling airflow has traditionally flowed around sonotrodes to lower their temperature. Approaches have also been developed to cool at least partial regions of a sonotrode by means of liquid cooling.

However, traditional approaches for certain ultrasonic welding applications, especially for applications in which bulky joining partners are to be welded with particularly high energies and/or over particularly long periods of time and/or in which a large number of welds are to be performed in succession, have proven to be insufficiently efficient and/or technically difficult to implement.

SUMMARY

There may be a requirement for a sonotrode assembly as well as an ultrasonic welding device equipped therewith in which regions of an oscillator assembly may be cooled efficiently and/or in a manner that is technically easy to implement.

Such a requirement may be met by the subject matter of the independent claims. Advantageous embodiments are defined in the dependent claims and the following description.

According to a first aspect of the invention, a sonotrode assembly for an ultrasonic welding device is described, the sonotrode assembly comprising an oscillator assembly and a cooling device. The cooling device comprises at least one cooling body. The cooling body is held supported in the cooling device in such a manner that the cooling body is reversibly displaceable between an abutting position in which a contact surface of the cooling body abuts on a contact surface of the oscillator assembly and a spaced position in which the contact surface of the cooling body is spaced apart from the contact surface of the oscillator assembly.

According to a second aspect of the invention, an ultrasonic welding device is described which comprises a sonotrode assembly according to an embodiment of the first aspect of the invention and an anvil.

Without limiting the scope of the invention in any way, ideas and possible features relating to embodiments of the invention may be considered to be based, inter alia, on the thoughts and findings described below.

In the following, the term "sonotrode assembly" is used for an aggregate of an oscillator assembly and a cooling device used for cooling thereof. The oscillator assembly comprises at least one ultrasonic vibration generator and one sonotrode coupled to the ultrasonic vibration generator. In this context, an ultrasonic vibration generator is understood to be an arrangement of one, two or more components which generates ultrasonic vibrations, possibly modifies them and ultimately couples them into the sonotrode. The ultrasonic vibration generator typically comprises a converter in which electrical signals are converted into ultrasonic vibrations and, in many cases, a booster in which the ultrasonic vibrations are modified before being transmitted to the connected sonotrode.

As already indicated at the outset, the oscillator assembly of an ultrasonic welding device should be cooled to prevent high temperatures during an ultrasonic welding operation and the resulting adverse effects on the weld produced between joining partners.

In a conventional air cooling system used for this purpose, a stream of ambient air or, in some cases, specially pre-cooled air is directed at the sonotrode in such a manner that the air flows around the sonotrode, thereby dissipating heat from it. Such air cooling is relatively easy to implement and does not significantly impact a functionality of the sonotrode. In particular, there is generally no impact on a vibration behavior of the sonotrode. However, a heat capacity of air is relatively low such that cooling by air circulation alone may be insufficient, particularly in applications where a great deal of heat is released in the sonotrode. This may result in the sonotrode having to cool down for a relatively long time between two welding operations which may extend cycle times for welding operations that are to be performed consecutively.

Efforts were therefore made to develop a liquid cooling system to cool the sonotrode more effectively. For example, it was proposed in WO 2017/001255 A2 to provide channels in sonotrodes through which a cooling liquid may be conducted.

It was realized, however, that it may be technically difficult to implement cooling channels for example directly in a sonotrode and to conduct cooling liquid through them. In particular, it was realized that the generated cooling channels and the cooling liquid conducted through them may significantly impact a vibration behavior of the sonotrode. Accordingly, it may be necessary, for example, to take great care when designing the geometry of the sonotrode, the cooling channels provided therein, the cooling liquid to be conducted and/or a connection of the sonotrode to an ultrasonic vibration generator or to a cooling liquid supply, it being possible, despite such a specific design, to adversely impact the vibration behavior of the sonotrode compared to a conventional sonotrode without such integrated liquid cooling.

It is therefore proposed to provide a cooling device in a sonotrode assembly which may efficiently cool the oscillator assembly but preferably has no impact or at most a minimum impact on ultrasonic vibrations generated therein during a welding process.

For this purpose, the cooling device has at least one cooling body. The cooling body is to have the property of having a lower temperature than the oscillator assembly during operation of the ultrasonic welding device and is to be able to efficiently dissipate heat from the oscillator assembly due to this temperature difference. On the one hand, the cooling body may be actively cooled if necessary, for example, by means of fluid cooling as described in more detail below. On the other hand, the cooling body should consist at least in certain areas of a material which has high thermal conductivity and preferably also a high heat capacity. For example, the cooling body may consist at least in certain areas of a metal, in particular a metal with above-average thermal conductivity and/or heat capacity.

The cooling body, however, should not be in continuous mechanical and thus heat-conducting contact with the oscillator assembly or with one or more of its components, such as the sonotrode in particular. Instead, the cooling device should be configured in such a manner that the cooling body may be displaced between an abutting position and a spaced position. In the abutting position, a contact surface of the cooling body should abut on a contact surface of the oscillator assembly such that mechanical and heat-conductive contact is established between the two contact surfaces. In contrast, in the spaced position, the oscillator assembly and cooling body should be spaced apart from each other in such a manner that their contact surfaces do not touch.

In principle, the cooling device may have merely one cooling body. It may, however, be advantageous to provide a plurality of cooling bodies which may contact the oscillator assembly or individual or several of its components, respectively, for example, from opposing sides and/or which may contact different partial regions of the oscillator assembly.

The cooling body may be displaced linearly, pivoted about an axis of rotation, displaced along a link or otherwise displaced between the abutting position and the spaced position.

Due to displaceable mounting of the cooling body, the cooling body may cooperate advantageously with the oscillator assembly in a cooling manner without, however, having an adverse effect on its ultrasonic vibration behavior during a welding operation. In particular, the cooling body may be applied to the oscillator assembly only intermittently, i.e. during phases when the oscillator assembly is not being used for welding and thus does not need to vibrate, by displacing it into the abutting position to remove heat from the oscillator assembly by thermal conduction. However, during phases in which the oscillator assembly is to weld joining partners and must therefore vibrate ultrasonically, the cooling body may be displaced into the spaced position so that the oscillator assembly is not impacted in its vibration behavior by a mass of the cooling body abutting on it.

Accordingly, with the aid of the cooling device proposed herein, efficient cooling of the oscillator assembly may be enabled without this requiring significant modification of the oscillator assembly itself. In particular, there is no need to provide cooling channels in the oscillator assembly and particularly in its sonotrode which could change the vibration behavior of the oscillator assembly. Instead, conventional oscillator assemblies may be used with the sonotrode assembly proposed here and there is also no need for development effort to modify them to establish a cooling option.

The proposed sonotrode assembly thus enables efficient cooling of the sonotrode but without adversely impacting its functionality during ultrasonic welding operations. The cooling device of the sonotrode assembly is relatively easy to implement technically.

According to one embodiment, the contact surface of the cooling body may have a contour which, at least in certain areas, is complementary in shape to a partial region of the contact surface of the oscillator assembly.

Expressed differently, the contact surface of the cooling body may be configured geometrically in such a manner that it may be applied superficially to the contact surface of the oscillator assembly at least in certain areas. Thus in the abutting position of the cooling body, a superficial and consequently thermally highly conductive contact may arise between the two contact surfaces via which a great deal of heat may be dissipated from the oscillator assembly.

A geometry of the contact surfaces and, if necessary, of the entire cooling body may be selected, for example, depending on properties of the oscillator assembly, such that it is possible to dissipate sufficient heat from the oscillator assembly within a short time with the aid of the at least one cooling body. Accordingly, a cooling phase, during which the oscillator assembly is not used for welding and the cooling body in its abutting position is used instead to cool the oscillator assembly, may be kept short so that cycle times between consecutive ultrasonic welding operations may be shortened overall.

How the contact surfaces should be selected for a specific sonotrode assembly may depend on various factors such as
  (i) a power at which the oscillator assembly is to be operated and which correlates with a heat generation in the oscillator assembly, (ii) a material of the oscillator assembly and/or of the cooling body and thus of a thermal conductivity and a heat capacity of these two components, (iii) a temperature difference between the oscillator assembly and the cooling body to be brought about, for example, by active cooling of the cooling body, or other factors.

For example, the contact surface of the sonotrode, via which heat is dissipated into the cooling body, may account, for example, for a proportion of between 1% and 99%, preferably between 10% and 90%, of a total surface of the oscillator assembly or of its sonotrode. In this case, the contact surface of the oscillator assembly or of its sonotrode may be brought into contact with a single contact surface of a single cooling body or preferably with a plurality of contact surfaces of a plurality of cooling bodies. On the one hand, the contact surface of the oscillator assembly should not be too small to allow sufficient heat transfer to the cooling body. On the other hand, the entire surface of the oscillator assembly does not normally act as a contact surface since partial regions of this surface, for example, are difficult to reach, mechanically sensitive and/or non-contacted regions must remain, since the cooling body or bodies require space in order to be displaced from their abutting position to their spaced position.

According to one embodiment, the cooling body may have a deformable element on a side directed toward the oscillator assembly. The contact surface of the cooling body may be formed by an outer surface of the deformable element directed toward the oscillator assembly. Alternatively or additionally, the oscillator assembly may have a deformable element on a side directed toward the cooling body, the contact surface of the oscillator assembly being formed by an outer surface of the deformable element directed toward the cooling body. The deformable element may be configured in each case to deform in the abutting position in such a manner that the outer surface of the deformable element adapts to the opposing contact surface of the oscillator assembly or cooling body.

In other words, it may be advantageous to configure the cooling body and/or the oscillator assembly in such a manner that their respective contact surfaces do not have a rigid contour but may be deformed with relatively small forces. For this purpose, a deformable element may be configured on the cooling body and/or the oscillator assembly, which deformable element forms the contact surface toward the opposing oscillator assembly or the cooling body. The deformable element may be held or supported by a basic body of the cooling body or the oscillator assembly. In this case, the deformable element may have sufficiently high thermal conductivity and be in sufficient contact with the basic body to be able to transfer heat absorbed on the contact surface to the basic body.

Such a deformable element, for example, may be a deformable layer and/or a deformable structure, in particular a deformable surface structure. The deformable layer, for example, may be a layer made of a material that may be deformed with low forces compared to a material of which the basic body of the cooling body or the oscillator assembly consists, in particular compared to a solid metal. For example, such a layer may consist of an elastomer material. Alternatively or additionally, a deformable structure or surface structure, for example in the form of fins, pimples or similar, may be provided which may be deformed with low forces compared to a solid structure. For example, as a further alternative, the deformable element may be configured with a liquid or a type of gel which are introduced into a flexible shell. The deformable element may be elastically and/or plastically deformable.

Due to the deformability of the deformable element which forms the contact surface, the cooling body in its abutting position may adapt as superficially as possible to the contact surface of the oscillator assembly. In this way, a contact with very good thermal conductivity may be established between the cooling body and the oscillator assembly.

According to one embodiment, the cooling device may comprise at least one cooling body with cooling channels and a cooling fluid conveying device. The cooling fluid conveying device may be configured to convey a cooling fluid through the channels of the cooling body.

Expressed differently, the cooling device may be configured in such a manner that its cooling body may be actively cooled. The cooling fluid conveying device to be provided here may conduct a cooling fluid, i.e. a cooling liquid or a cooling gas, into the cooling body through cooling channels. For this purpose, the cooling fluid may be brought to a lower temperature than that of the cooling body beforehand so that it may dissipate heat from the cooling body as it is conducted through the cooling channels.

The possibility of being able to actively cool the cooling body ultimately indirectly creates the possibility of being able to use the cooling body to cool the oscillator assembly quickly and efficiently.

However, in contrast to conventional approaches in which a cooling fluid is to be conducted directly through cooling channels in the oscillator assembly, in the embodiment described here the cooling fluid is to be conducted through the separate cooling body and the latter is only to be brought into thermal contact with the oscillator assembly intermittently.

Active cooling of the cooling body by conducting cooling fluid through it may be much easier to implement technically than cooling the oscillator assembly by conducting cooling fluid directly through said oscillator assembly. In particular, the cooling body may be a component which is relatively easy to design and which is not generally subject to any special mechanical requirements. For example, unlike the oscillator assembly, the cooling body need not have any specific vibration characteristics, in particular ultrasonic vibration characteristics, which could be impacted by a geometry of cooling channels.

In addition, the approach of having the cooling body pressed against the oscillator assembly only when the oscillator assembly is not vibrating ultrasonically between two welding operations allows the cooling body itself not to be exposed to any ultrasonic vibrations during operation of the ultrasonic welding device. For example, this may significantly simplify connection of the cooling channels provided in the cooling body to the cooling fluid conveying device and/or sealing of the cooling circuit formed in this way.

According to a detailed embodiment, the cooling channels on the cooling body may be formed by through channels which extend through the cooling body and are enclosed on all sides.

The cooling channels may thus be open only at their opposing ends where they may be connected to the cooling fluid conveying device, for example, and form a fluid-tight closed system therebetween. Accordingly, the cooling fluid conveying device may pump cooling fluid through the cooling channels. Overall, a cooling circuit may be formed in which cooling fluid absorbs heat as it flows through the cooling channels and subsequently releases the heat again before the cooling fluid conveying device conveys it through the cooling channels again. For example, the cooling channels may extend through the cooling body as through channels in the form of through holes.

In this case, according to one embodiment, the cooling fluid conveying device may be configured to convey a liquid through the cooling channels of the cooling body.

Expressed differently, the cooling fluid may be a liquid and this liquid may be pumped through the cooling channels of the cooling body by the cooling fluid conveying device.

For example, water, various oils or other liquid coolants may be used as the liquid.

Liquids generally have a higher heat capacity and/or higher thermal conductivity than gases and are therefore more suitable for cooling than air, for example, for many applications.

Alternatively or additionally to an embodiment with through channels for the liquid cooling described above, the cooling channels on the cooling body may be formed with protruding cooling fins.

The cooling fins, for example, may protrude from the basic body of the cooling body. The cooling fins may be formed integrally with the basic body or be in good thermal contact with it. Cooling channels may be configured between the cooling fins, which cooling channels may be open on at least one side. A cooling fluid conveying device may conduct a cooling fluid through these cooling channels which are open on one side so that the cooling body as a whole may be actively cooled.

According to one embodiment, the cooling fluid conveying device may be configured in this case to convey a gas, in particular air, through the cooling channels of the cooling body.

The gas may serve as a cooling fluid to dissipate heat from the cooling body as it flows through the cooling channels. Although gases generally have a lower heat capacity and/or lower thermal conductivity than liquids, cooling using gases may be advantageous for some applications, in particular for applications that do not require particularly high cooling capacities. For example, when a gas is used as the cooling fluid, in many cases it is not necessary to configure the cooling circuit as a hermetically sealed circuit. Accordingly, it is often possible to dispense with the provision of special seals. In addition, cooling by means of cooling gases is usually technically easier to implement and/or maintain than cooling by means of cooling liquids. For example, there is not usually any need to provide special cooling fluid reservoirs and in many cases there is also a negligible risk of leaks.

For example, some kind of blower or fan may convey gaseous cooling fluid, in particular air, through the cooling channels defined by the cooling fins. If necessary, gas may be conveyed through such channels under increased pressure, for example as compressed air, thereby dissipating more heat due to high flow velocities.

According to one embodiment, the cooling device may comprise two cooling bodies. In this case, the cooling bodies may be held supported in the cooling device in such a manner that the cooling bodies are reversibly displaceable between an abutting position, in which the two cooling bodies abut the oscillator assembly on mutually opposing contact surfaces with one contact surface each, and a spaced position, in which the two cooling bodies with their respective contact surfaces are each spaced apart from the contact surfaces of the oscillator assembly.

Expressed differently, the cooling device may be equipped with at least two cooling bodies instead of only one. If necessary, the two cooling bodies may be applied to their respectively assigned contact surfaces of the oscillator assembly from opposing sides in order to cool said oscillator assembly. In this case, the contact surface of each one of the cooling bodies may mechanically and thermally contact only part of the surface of the oscillator assembly, in particular half at most of the surface of the oscillator assembly or of a partial region of the oscillator assembly. Overall, the two cooling bodies may contact a large, preferably a predominant portion of the surface of the oscillator assembly or of a partial region of the oscillator assembly.

During a welding operation, the two cooling bodies may each be displaced to their spaced position, thus releasing the oscillator assembly so that it may vibrate unobstructed. For example, the two cooling bodies may be displaced in opposite directions for this purpose. In particular, the two cooling bodies may be moved away from each other linearly or be forced apart by pivoting them away from each other.

According to one embodiment, the cooling device may comprise at least one actuator which is configured to displace the at least one cooling body between the abutting position and the spaced position.

The actuator may be configured in a variety of ways and be directly or indirectly coupled to the cooling body. In this case, the actuator may bring about a displacement of the cooling body between the abutting and the spaced position by forces generated by the actuator electrically, electromagnetically, pneumatically, hydraulically or in another way. For example, the actuator may comprise an electrical servomotor, an electromagnetic actuator element, pneumatics, hydraulics or the like. In this case, the actuator may be configured to reversibly displace the one or more cooling bodies between the spaced and the abutting position linearly, pivotably or in another way. With the aid of the actuator, the cooling device may thus automatically apply the at least one cooling body to the oscillator assembly or move it away from the oscillator assembly.

According to one embodiment, the sonotrode assembly may further comprise a control system which is configured to control the at least one actuator, to displace the at least one cooling body into the spaced position during a welding phase in which ultrasonic vibrations are generated in the oscillator assembly and to displace the at least one cooling body into the abutting position during an idle phase in which no ultrasonic vibrations are generated in the oscillator assembly.

Expressed differently, a control system may detect whether ultrasonic vibrations are currently being generated in the oscillator assembly in order to perform an ultrasonic welding operation or whether the oscillator assembly is currently resting passively without ultrasonic vibrations, for example, in order to allow it to cool down between two ultrasonic welding operations. Depending on the current detected state of the oscillator assembly, the control system may control the cooling device, with the help of its at least one actuator, to move the at least one cooling body into its abutting position or into its spaced position. During the idle phase, the cooling body is pressed against the contact surface of the oscillator assembly with the aid of the actuator in order to dissipate heat. Shortly before a next welding phase is started, the control system may then control the actuator to displace the cooling body away from the contact surface.

With the aid of the control system and the actuator, it is thus possible to automatically carry out a cooling process in which the oscillator assembly is to be temporarily cooled by applying the cooling body.

According to one embodiment, the oscillator assembly may be displaceable in a first direction between an idle position and a welding position. The at least one cooling body may be displaceable in a second direction transverse to the first direction in order to be displaced between the abutting position and the spaced position.

In other words, the oscillator assembly may be configured not as a stationary fixed component but may be displaced between the idle position and the welding position. In the welding position, a sonotrode head may be displaced toward an anvil, thereby reducing the size of the receiving chamber between these two components and clamping the joining partners received in the receiving chamber between the sonotrode head and the anvil. In this welding position, the oscillator assembly may then be vibrated ultrasonically and the ultrasonic welding operation may be performed. Following an ultrasonic welding operation, the oscillator assembly may be moved to its idle position, the receiving chamber being enlarged again so that the joining partners may be removed and, if necessary, new joining partners may be inserted for a subsequent welding process. Ultrasonic welding devices configured in this manner are frequently used in particular to weld strands to contact elements or to weld metal sheets to each other.

In an oscillator assembly designed to be displaceable in this way, the cooling device of the sonotrode assembly may be configured in such a manner that its at least one cooling body may be displaced transverse to the direction of displacement of the oscillator assembly. Expressed differently, a displacement of the oscillator assembly and a direction of displacement of the cooling body may be transverse, in particular perpendicular, to each other. For example, the direction of displacement of the oscillator assembly may extend vertically and the direction of displacement of the cooling body may extend horizontally. The direction of displacement of the cooling body may be rectilinear or curved. For example, the cooling body may be rotated or pivoted about an axis.

In its abutting position, the cooling body may contact the oscillator assembly located in its idle position in such a manner that it would no longer be possible to displace it, but in its spaced position it may release the oscillator assembly in such a manner that it may be moved to its welding position. The cooling body may be guided in its displacement movement by a suitable guide and/or may be moved with the aid of a suitable actuator.

According to one embodiment, the sonotrode may comprise a sonotrode head and the sonotrode head may comprise a pressing surface with which joining partners are pressed against an anvil during a welding operation and ultrasonic vibrations are transmitted from the sonotrode head to the joining partners. In this case, the at least one cooling body may be configured and displaceable in such a manner that in its abutting position it abuts laterally on the sonotrode head.

Generally, on the one hand, the sonotrode head is the region of the sonotrode which is exposed to the greatest temperature increase during a welding operation. In particular, during ultrasonic welding, the sonotrode head is pressed with its pressing surface against joining partners which are supported on their opposite side by the anvil. In the process, the sonotrode head may heat up significantly, making it a region of the oscillator assembly most in need of cooling. On the other hand, the sonotrode head usually represents the region of the oscillator assembly which reacts most sensitively to modifications to its geometry and/or to contact due to masses acting on it.

Accordingly, it was difficult with conventional approaches such as an integrated liquid cooling to efficiently cool this sonotrode head without interfering with its vibration behavior during a welding operation and ultimately impairing welding results.

While the approach presented herein of a displaceable cooling body which may be temporarily pressed against the oscillator assembly may, in principle, be used to cool any region of the oscillator assembly, it is particularly suitable for cooling the sonotrode head which is otherwise difficult to cool.

In this case, the one or the plurality of cooling bodies may be positioned, for example, against one or a plurality of opposing lateral surfaces of the sonotrode head and/or, if necessary, against an exposed front face of the sonotrode head. In certain applications, it is also conceivable to apply one or a plurality of cooling bodies directly against the pressing surface of the sonotrode head and/or against a rear surface of the sonotrode head opposite thereto.

Embodiments of the sonotrode assembly described herein or of the ultrasonic welding device equipped therewith may render various advantages possible. By comparison with conventional sonotrode assemblies with air cooling, for example, the use of the cooling device proposed herein, which may be actively cooled if necessary, may enable shorter cycle times for successive ultrasonic welding operations since the welding tools, in particular the sonotrode, may be efficiently cooled between two ultrasonic welding operations. In addition, it is possible to achieve a spatially and/or temporally more uniform temperature in the oscillator assembly. Temperature peaks in the sonotrode, in particular in its sonotrode head, may be smoothed. Overall, tool wear may be reduced and/or energy efficiency of the entire ultrasonic welding device may be improved.

It should be noted that possible features and advantages of embodiments of the invention are explained herein partly with reference to an ultrasonic welding device and its sonotrode assembly configured according to the invention and partly with reference to a manner of operating or using the same. A person skilled in the art will recognize that the features described for individual embodiments may be suitably transferred to other embodiments in an analogous manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, and neither the drawings nor the explanations are to be construed as limiting the invention in any way.

The figures are merely schematic and not to scale. Identical reference numerals in the various drawings denote identical features or features having the same effect.

DETAILED DESCRIPTION

Figure 1:
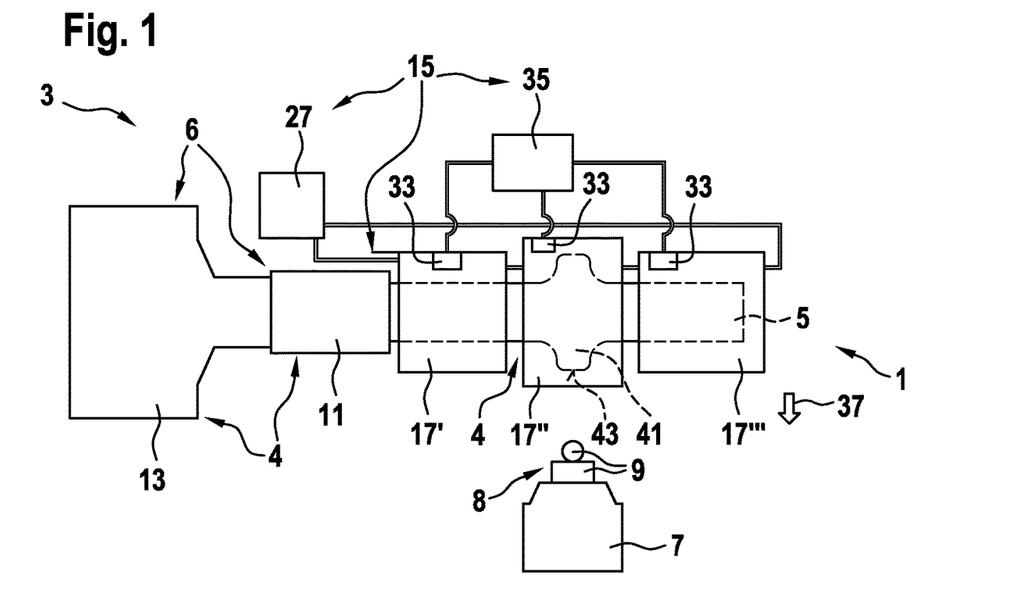
FIG. 1 shows a greatly simplified view of an ultrasonic welding device according to an embodiment of the present invention.
Figure 2:
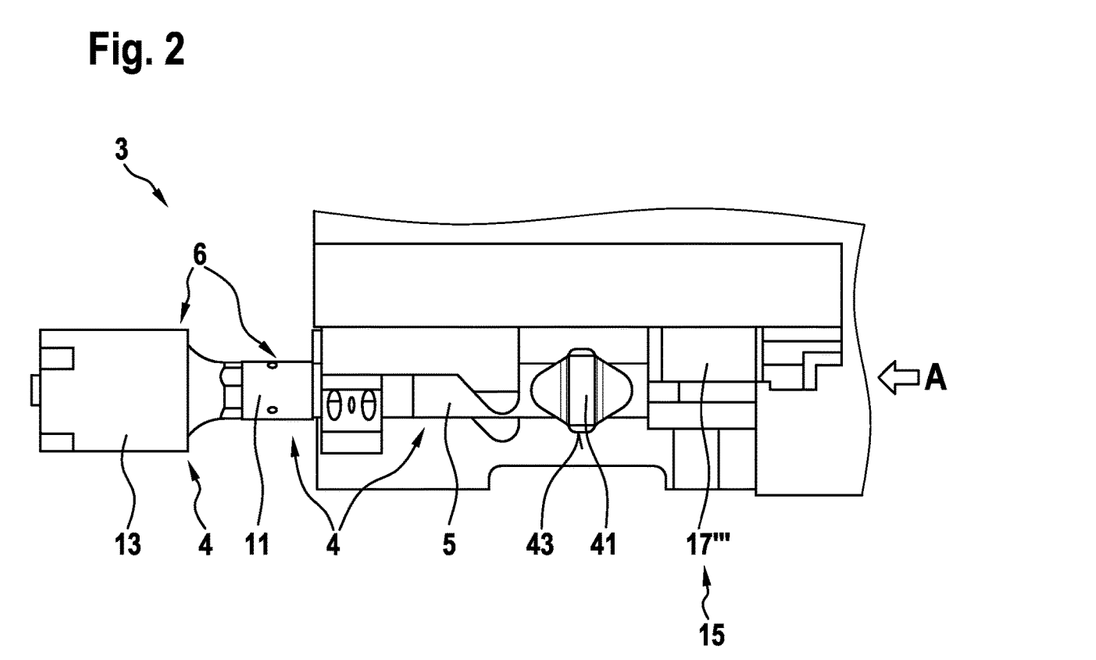
FIG. 2 shows a lateral view of a sonotrode assembly for an ultrasonic welding device according to an embodiment of the present invention.
Figure 3:
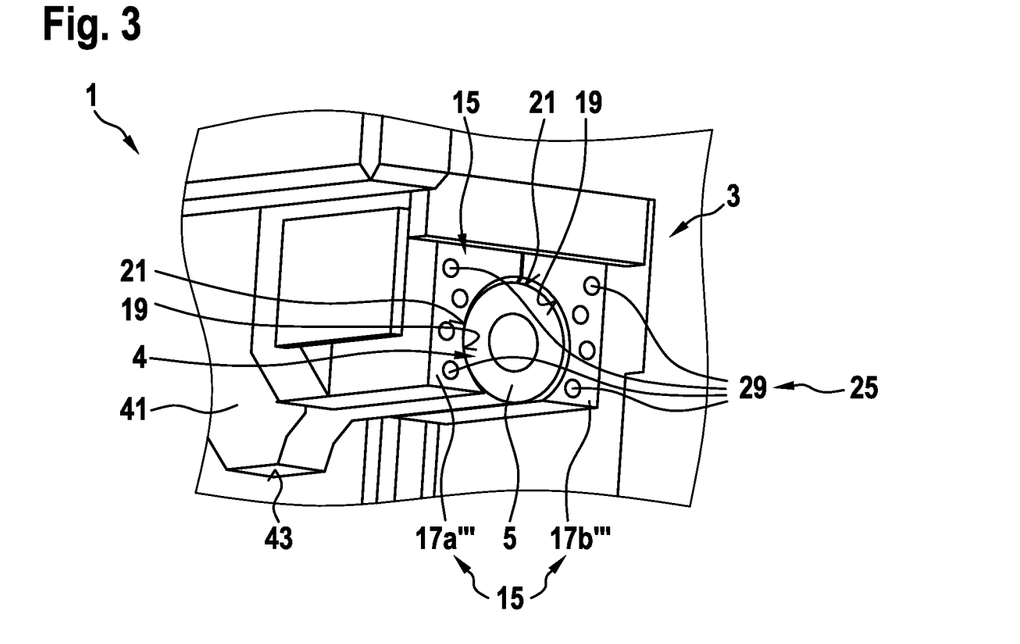
FIG. 3 shows a perspective partial view in the direction A shown in FIG. 2 of the sonotrode assembly from FIG. 2.
Figure 4:
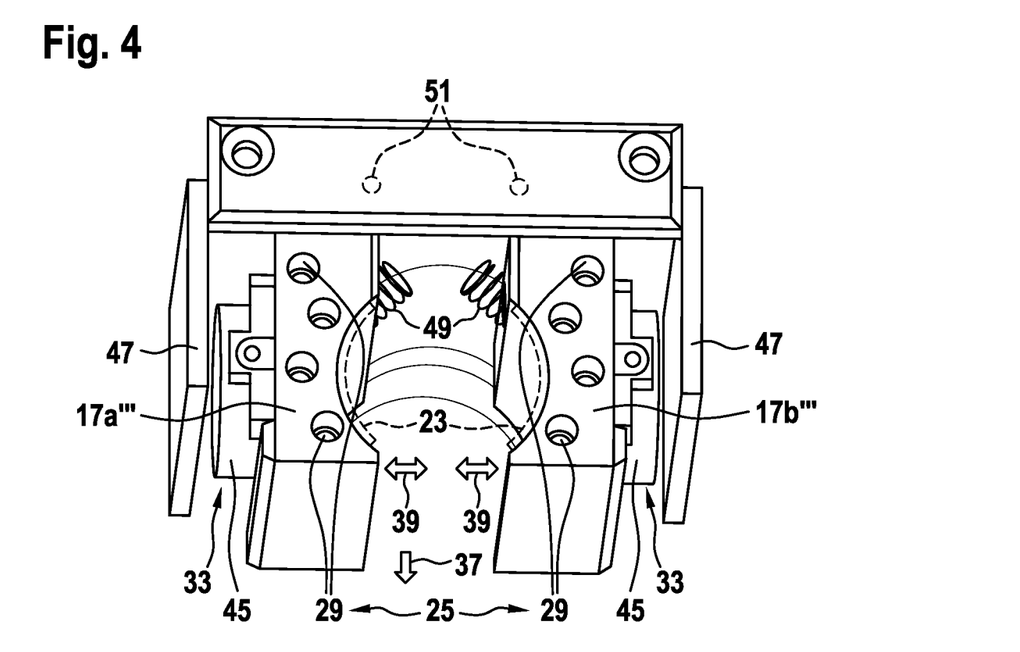
FIG. 4 shows a perspective view of parts of the cooling device of the sonotrode assembly from FIG. 2.

FIG. 1 shows a greatly simplified view of an ultrasonic welding device 1 according to an embodiment of the present invention. FIGS. 2 to 4 show a lateral view of a sonotrode assembly 3 of the ultrasonic welding device 1 and perspective views of partial regions of this sonotrode assembly 3, in particular of its cooling device 15 and its oscillator assembly 4.

The ultrasonic welding device 1 comprises the sonotrode assembly 3 with an oscillator assembly 4 and an anvil 7. The oscillator assembly 4 comprises a sonotrode 5 and an ultrasonic vibration generator 6 with a converter 13 and a booster 11, the sonotrode 5 being coupled at one end to the converter 13 via the booster 11 and being capable of being ultrasonically vibrated via the latter. The sonotrode 5 comprises sonotrode head 41 with a pressing surface 43 directed toward the anvil 7. A receiving chamber 8 is located between the pressing surface 43 and a surface of the anvil 7 directed toward the sonotrode head 41. The receiving chamber 8 may be laterally defined by further components, for example one or more lateral slides (not shown for reasons of clarity). Joining partners 9, for example a strand and a contact element to be welded to the strand, may be received in the receiving chamber 8. In alternative embodiments, sheets to be welded and/or strands of cables to be welded or individual wires of a strand to be compressed by welding may also be received in the receiving chamber. The entire sonotrode assembly 3 may be displaced in a first direction 37 with the aid of a displacement mechanism (not shown for reasons of clarity) so that the oscillator assembly 4 and, in particular, its sonotrode head 41 is moved toward the anvil 7, reducing the size of the receiving chamber 8 and thus pressing the joining partners 9 together.

During an ultrasonic welding operation, the oscillator assembly 4 and in particular its sonotrode head 41 are intensely heated. To prevent excessive heating from resulting in a deterioration of welding results between the joining partners 9, the sonotrode assembly 3 has a cooling device 15.

In the example shown, the cooling device 15 has a plurality of cooling bodies 17. In this case, a first pair of cooling bodies 17' is arranged at a proximal end of the sonotrode 5 in a region which extends between the booster 11 and the sonotrode head 41. A second pair of cooling bodies 17" is provided in the region of the sonotrode head 41 (not shown in FIG. 2 for reasons of clarity). A third pair of cooling bodies 17'" is arranged in a vicinity of a distal end of the oscillator assembly 4. Alternatively or additionally, cooling bodies (not shown) may be provided to enable cooling of other components of the oscillator assembly 4, such as its booster 11 or its converter 13.

In the example described, the various cooling bodies 17 are to be actively cooled with the aid of liquid cooling. For this purpose, the sonotrode assembly 3 has a cooling fluid conveying device 27. The cooling fluid conveying device 27 pumps a cooling liquid through cooling channels 25 in the form of through channels 29 which extend through the various cooling bodies 17. The liquid cooling may be configured differently in detail and is shown only schematically in FIG. 1 and in the other figures only with respect to the cooling channels 25.

The cooling bodies 17 of the cooling device 15 are held supported in such a manner that each individual cooling body 17 may be reversibly displaced between an abutting position and a spaced position. In the abutting position, a contact surface 19 of the respective cooling body 17 abuts on an adjacent contact surface 21 of the oscillator assembly 4. In the spaced position, however, the two contact surfaces 19, 21 are spaced apart from one another via an air gap. In this case, a width of the air gap should be significantly greater than an ultrasonic vibration amplitude in the radial direction, with which the oscillator assembly vibrates during the welding operation. For example, the air gap may have a width of more than 1 mm.

In this case, the cooling device 15 may be moved together with the remainder of the sonotrode assembly 3 in the direction 37 toward the anvil 7 for welding and may be moved back contrary to the direction 37 during idle phases.

Alternatively, the cooling bodies 17 in their spaced position may be spaced apart from the oscillator assembly 4 to such an extent that the oscillator assembly 4 may be displaced in the first direction 37, that is vertically in the example shown, toward the anvil 7.

The cooling bodies 17 may be displaced between their spaced position and their abutting position preferably in a second direction 39 which extends transverse, for example perpendicular, to the first direction 37, i.e. horizontally in the example shown.

For this purpose, the sonotrode assembly 3 or its cooling device 15 has one or more actuators 33. In this case, an actuator 33 may reversibly move one or more cooling bodies 17 back and forth between their abutting position and their spaced position. The actuators 33 may be controlled by a control system 35.

In this case, the control system 35 may control the actuators 33 to displace the cooling bodies 17 into the spaced position during a welding phase in which the oscillator assembly 4 is vibrated ultrasonically, and to subsequently displace the cooling bodies 17 into the abutting position during an idle phase in which no ultrasonic vibrations are generated in the oscillator assembly 4 and instead the latter is to be cooled as efficiently as possible.

FIGS. 3 and 4 show a possible embodiment of a cooling device 15 with the aid of which a cylindrical region of a sonotrode 5 may be cooled. In this case, the cooling bodies 17a'" and 17b'" are arranged on opposing sides of the sonotrode 5. Each of the cooling bodies 17a'" and 17b'" is formed in this case as a kind of shell made of metallic material, in which a contact surface 19 directed toward the sonotrode 5 has a contour formed complementary to the contact surface 21 of the sonotrode 5. In this specific case, the contact surface 19 of the two cooling bodies 17 is cylindrically concave in each case.

In each of the cooling bodies 17 there is a plurality of through channels 29 through which cooling fluid may be conducted and which may thus act as cooling channels 25.

Each of the two cooling bodies 17a'" and 17b'" is mounted to pivot about a respective pivot axis 51. An associated actuator 33 has an electromagnet 45 with the aid of which the respective cooling body 17a'" and 17b'" may be pulled toward an iron plate 47 and thus toward its spaced position. In addition, one spring 49 in each case engages on each of the cooling bodies 17a'" and 17b'" to move it toward the abutting position when the electromagnet 45 is not actuated.

A optional deformable element 23, one surface of which may form the contact surface 19 of the cooling body, is provided merely schematically and dashed on each of the cooling bodies 17a'" and 17b'" on a side directed toward the sonotrode 5. For example, the deformable element 23 may be a layer of an elastic material such as an elastomer, the material preferably having a best possible thermal conductivity. In this case, the deformable element 23 should preferably be pliable in such a manner that it may adapt to the contact surface 21 of the sonotrode 5 over a large area.

In addition or alternatively to the liquid cooling implemented in the embodiment shown by way of example, air cooling may be used in the cooling device 15 to cool the cooling bodies 17. For this purpose, a structure made of cooling fins (not shown for reasons of clarity) may be provided on each of the cooling bodies 17, for example, on a surface directed outward, i.e. contrary to the contact surface 19. Cooling channels open to the outside may form between adjacent cooling fins, through which channels an airflow may be produced to dissipate heat.

Due to the cooling device 15 proposed for the sonotrode assembly 3 presented here, the oscillator assembly 4 may be cooled quickly and efficiently between successive ultrasonic welding operations. This makes it possible to shorten cycle times during ultrasonic welding, reduce wear on components of the ultrasonic welding device 1 and/or improve a quality of welded products.

Finally, it should be noted that terms such as "having", "comprising", etc. do not exclude any other elements or steps and that terms such as "one" or "a" do not exclude a plurality. It should further be pointed out that features or steps which have been described with reference to one of the above exemplary embodiments may also be used in combination with other features or steps of other exemplary embodiments described above. Reference numerals in the claims are not to be regarded as a limitation.

LIST OF REFERENCE NUMERALS

1 Ultrasonic welding device
3 Sonotrode assembly
4 Oscillator assembly
5 Sonotrode
6 Ultrasonic vibration generator
7 Anvil
8 Receiving chamber
9 Joining partner
11 Booster
13 Converter
15 Cooling device
17 Cooling body
19 Contact surface of the cooling body
21 Contact surface of the sonotrode
23 Deformable element
25 Cooling channels
27 Cooling fluid conveying device
29 Through channels
31 Cooling fins
33 Actuator
35 Control system
37 First direction=direction of movement of the sonotrode
39 Second direction=direction of movement of the cooling body
41 Sonotrode head
43 Pressing surface
45 Electromagnet
47 Iron plate
49 Spring
51 Pivot axis

The invention claimed is:

1. A sonotrode assembly for an ultrasonic welding device, wherein the sonotrode assembly comprises:
   an oscillator assembly with an ultrasonic vibration generator and a sonotrode coupled to the ultrasonic vibration generator;
   a cooling device;
   wherein the cooling device comprises at least one cooling body,
   wherein the cooling body is held supported in the cooling device in such a manner that the cooling body is reversibly displaceable between an abutting position in which a contact surface of the cooling body abuts on a contact surface of the oscillator assembly and a spaced position in which the contact surface of the cooling body is spaced apart from the contact surface of the oscillator assembly,
   wherein the cooling device comprises at least one actuator which is configured to displace the at least one cooling body between the abutting position and the spaced position, and
   wherein the sonotrode assembly further comprises a control system which is configured to control the at least one actuator, to displace the at least one cooling body into the spaced position during a welding phase in which ultrasonic vibrations are generated in the oscillator assembly, and to displace the at least one cooling body into the abutting position during an idle phase in which no ultrasonic vibrations are generated in the oscillator assembly.

2. The sonotrode assembly according to claim 1, wherein the contact surface of the cooling body has a contour which, at least in certain areas, is complementary in shape to a partial region of the contact surface of the oscillator assembly.

3. The sonotrode assembly according to claim 1, wherein the cooling body has a deformable element on a side directed toward the oscillator assembly, wherein the contact surface of the cooling body is formed by an outer surface of the deformable element which is directed toward the oscillator assembly and/or wherein the oscillator assembly has a deformable element on a side directed toward the cooling body, wherein the contact surface of the oscillator assembly is formed by an outer surface of the deformable element which is directed toward the cooling body,
wherein the deformable element is configured to deform in the abutting position in such a manner that the outer surface of the deformable element adapts to the opposing contact surface of the oscillator assembly or of the cooling body.

4. The sonotrode assembly according to claim 1, wherein the cooling device comprises at least one cooling body with cooling channels and a cooling fluid conveying device,
wherein the cooling fluid conveying device is configured to convey a cooling fluid through the cooling channels of the cooling body.

5. The sonotrode assembly according to claim 4, wherein the cooling channels on the cooling body are formed by through channels which extend through the cooling body and are enclosed on all sides.

6. The sonotrode assembly according to claim 4, wherein the cooling fluid conveying device is configured to convey a liquid through the cooling channels of the cooling body.

7. The sonotrode assembly according to claim 4, wherein the cooling channels on the cooling body are formed with protruding cooling fins.

8. The sonotrode assembly according to claim 7, wherein the cooling fluid conveying device is configured to convey a gas through the cooling channels of the cooling body.

9. The sonotrode assembly according to claim 1, wherein the cooling device comprises two cooling bodies, wherein the cooling bodies are held supported in the cooling device in such a manner that the cooling bodies are reversibly displaceable between an abutting position, in which the two cooling bodies abut the oscillator assembly on mutually opposing contact surfaces with one contact surface each, and a spaced position, in which the two cooling bodies are each spaced apart from the contact surfaces of the oscillator assembly with their contact surface.

10. The sonotrode assembly according to claim 1,
wherein the oscillator assembly is displaceable in a first direction between an idle position and a welding position and
wherein the at least one cooling body is displaceable in a second direction transverse to the first direction in order to be displaced between an abutting position and the spaced position.

11. The sonotrode assembly according to claim 1,
wherein the oscillator assembly comprises a sonotrode head and the sonotrode head has a pressing surface with which joining partners are pressed against an anvil during a welding operation and ultrasonic vibrations are transmitted from the sonotrode head to the joining partners,
wherein the at least one cooling body in its abutting position abuts laterally on the sonotrode head.

12. An ultrasonic welding device comprising:
a sonotrode assembly according to claim 1, and
an anvil.

* * * * *